S. P. MACKEY.
Water Wheel.
No. 201,690. Patented March 26, 1878.
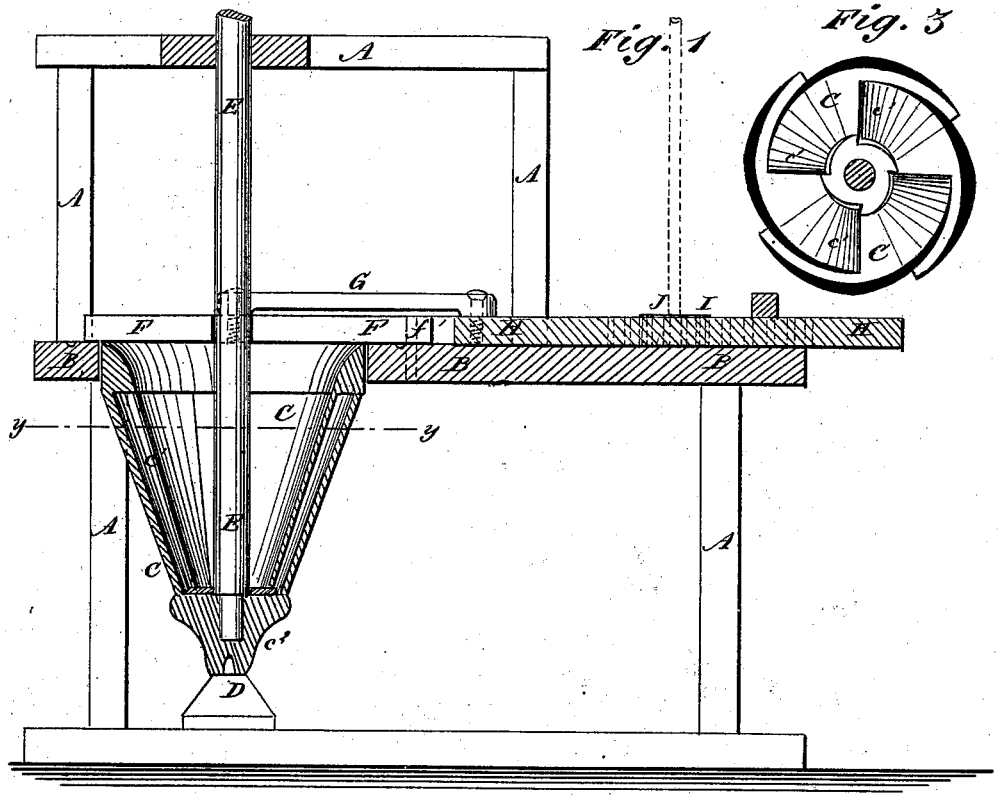
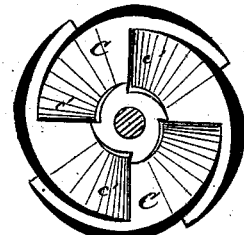
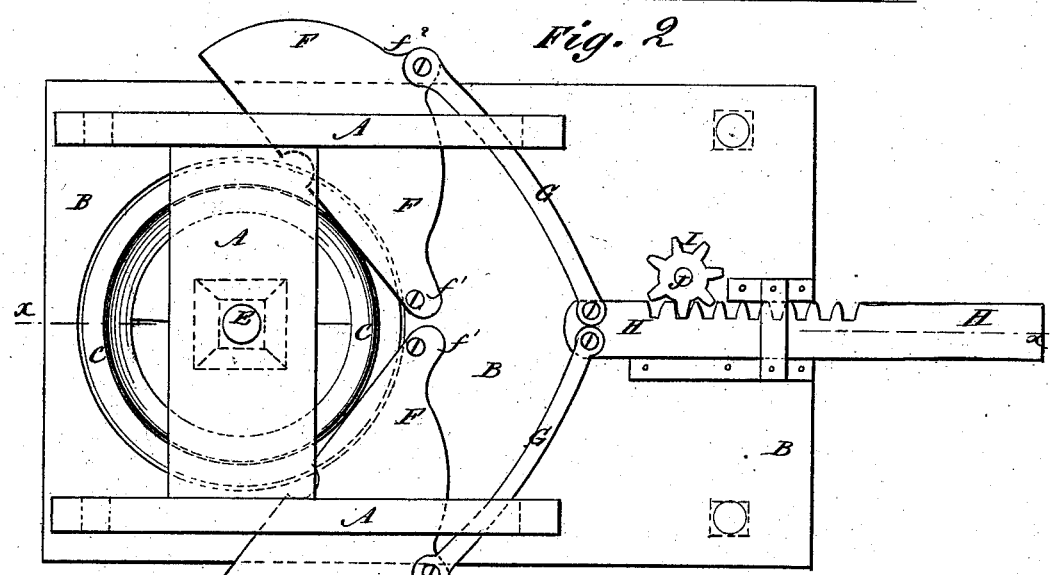
WITNESSES:
C. Neveux
C. Sedgwick
INVENTOR:
S. P. Mackey
BY ——
ATTORNEYS.

UNITED STATES PATENT OFFICE.

SAMUEL P. MACKEY, OF BROWNSBURG, VIRGINIA.

IMPROVEMENT IN WATER-WHEELS.

Specification forming part of Letters Patent No. 201,690, dated March 26, 1878; application filed February 8, 1878.

*To all whom it may concern:*

Be it known that I, SAMUEL PAXTON MACKEY, of Brownsburg, in the county of Rockbridge and State of Virginia, have invented a new and useful Improvement in Water-Wheels, of which the following is a specification:

Figure 1 is a vertical section of my improved water-wheel, taken through the line $xx$, Fig. 2. Fig. 2 is a top view of the same. Fig. 3 is a horizontal section of the wheel, taken through the line $yy$, Fig. 1.

Similar letters of reference indicate corresponding parts.

The object of this invention is to furnish an improved water-wheel, which shall be simple in construction, inexpensive in manufacture, strong, durable, and effective, not being liable to become choked or clogged, and which shall be so constructed that the water can be readily shut off and let on, fully or partially, as may be required.

The invention consists in the wheel made in the form of a funnel, having a solid lower end, with a socket in its bottom, and provided with buckets in its inclined sides, extending through one-quarter, more or less, of its circumference, in combination with the pivot, the vertical shaft, and the floor of the pen-stock, as hereinafter fully described.

A represents the frame-work, and B the floor, of the pen-stock. In the floor B is formed a round hole, in which is fitted the upper end or top of the wheel C. The wheel C is made funnel-shaped, with buckets $c^1$ in its sides, and with a solid lower end, $c^2$, in which is formed a socket, to receive a pivot, D, attached to the frame A, or to other suitable support.

The pivot D is designed to be made of lignum vitæ, or other suitable material. The buckets $c^1$ have their inlet-openings in the inner surface of the sides of the wheel C, and their outlet-openings in the outer surface of the said sides.

The buckets $c^1$ extend through one-quarter, more or less, of the circumference of the wheel, and correspond in form with the form of the sides of the said wheel.

To the center of the solid bottom $c^2$ of the wheel C is attached the lower end of the vertical shaft E, so that the said wheel may carry the said shaft with it in its revolution. The upper part of the shaft E revolves in bearings in the frame A, and from it power is taken to the machinery to be driven.

F are the gates, which are made in the form of half-circles, with notches in the center of their straight sides to fit around the shaft E, and with lugs $f^1$ at one end of their straight sides, by which they are pivoted to the bottom B of the pen-stock.

Upon the middle part of the curved edges of the gates F are formed lugs $f^2$, to which are pivoted the forward ends of two rods, G. The rear ends of the rods G are pivoted to the forward end of a bar, H, that slides in guides attached to the floor B of the pen-stock.

In the edge of the bar H are formed rack-teeth, into which mesh the teeth of a small gear-wheel, I, attached to the lower part of the rod J. The rod J is pivoted to the floor B, and should be of such a length that its upper end may rise above the water, as shown in dotted lines in Fig. 1, for convenience in adjusting the gates F.

Having thus described my invention, I claim as new and desire to secure by Letters Patent—

The wheel C, made in the form of a funnel, having a solid lower end, $c^2$, with a socket in its bottom, and provided with buckets $c^1$ in its inclined sides, extending through one-quarter, more or less, of its circumference, in combination with the pivot D, the vertical shaft E, and the floor B of the pen-stock, substantially as herein shown and described.

SAML. PAXTON MACKEY.

Witnesses:
H. L. TERRELL,
J. W. STONER.